United States Patent
Han et al.

(10) Patent No.: US 12,487,503 B2
(45) Date of Patent: Dec. 2, 2025

(54) WEARABLE ELECTRONIC DEVICE

(71) Applicant: Beijing Youzhuju Network Technology Co., Ltd., Beijing (CN)

(72) Inventors: Wu Han, Beijing (CN); You Li, Beijing (CN); Chao Jiang, Beijing (CN); Chen Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/570,585

(22) PCT Filed: Jul. 14, 2022

(86) PCT No.: PCT/CN2022/105665
§ 371 (c)(1),
(2) Date: Dec. 14, 2023

(87) PCT Pub. No.: WO2023/024745
PCT Pub. Date: Mar. 2, 2023

(65) Prior Publication Data
US 2024/0248374 A1 Jul. 25, 2024

(30) Foreign Application Priority Data
Aug. 24, 2021 (CN) .......................... 202110977244.5

(51) Int. Cl.
*G03B 11/04* (2021.01)
*G02C 11/00* (2006.01)
*G02F 1/133* (2006.01)
*G02F 1/1333* (2006.01)
*G02F 1/163* (2006.01)
*H04N 25/709* (2023.01)

(52) U.S. Cl.
CPC .......... *G03B 11/043* (2013.01); *G02C 11/10* (2013.01); *G02F 1/13318* (2013.01);
(Continued)

(58) Field of Classification Search
CPC ... G03B 11/043; G02C 11/10; G02F 1/13318; G02F 1/133305; G02F 1/163; H04N 25/709; H04N 23/65; G02B 27/01
See application file for complete search history.

(56) References Cited

U.S. PATENT DOCUMENTS 6,657,667 B1 * 12/2003 Anderson .............. H04N 5/262
348/333.12
10,547,814 B1 * 1/2020 Meyers ................ G03B 17/561
(Continued)

FOREIGN PATENT DOCUMENTS

| CN | 109495622 A | 3/2019 |
| CN | 110290330 A | 9/2019 |

(Continued)

OTHER PUBLICATIONS

China National Intellectual Property Administration, Office Action Issued in Application No. 202110977244.5, Dec. 28, 2024, 13 pages.
(Continued)

*Primary Examiner* — Michael E Teitelbaum
(74) *Attorney, Agent, or Firm* — Alleman Hall & Tuttle LLP

(57) ABSTRACT

A wearable electronic device, comprising: a glasses frame, two temples respectively connected to the glasses frame, lenses mounted on the glasses frame, at least one camera apparatus disposed in association with the lenses, and a camera light-transmitting hole disposed on the lenses and respectively corresponding to the at least one camera apparatus. The camera apparatus captures images through the corresponding camera light-transmitting hole. A shielding component is disposed on the side of the lenses away from the camera apparatus, and the shielding component is used for shielding the camera light-transmitting hole when the camera apparatus is turned off, and exposing the camera
(Continued)

light-transmitting hole when the camera apparatus is turned on, so as to enable light to pass through the camera light-transmitting hole. The provided wearable electronic device may flexibly shield and expose the exposed camera light-transmitting hole, which is beneficial to improving the aesthetics of the glasses.

6 Claims, 3 Drawing Sheets

(52) U.S. Cl.
CPC ........ *G02F 1/133305* (2013.01); *G02F 1/163* (2013.01); *H04N 25/709* (2023.01)

(56) References Cited

U.S. PATENT DOCUMENTS

| | | | |
|---|---|---|---|
| 2015/0260991 A1 | 9/2015 | Bhardwaj et al. | |
| 2015/0355519 A1* | 12/2015 | Vasiliev | G02F 1/15 359/266 |
| 2022/0174764 A1* | 6/2022 | Huang | G02B 27/0172 |
| 2022/0217308 A1* | 7/2022 | Mont-Reynaud | H04N 23/611 |

FOREIGN PATENT DOCUMENTS

| | | |
|---|---|---|
| CN | 110750022 A | 2/2020 |
| CN | 210015296 U | 2/2020 |
| CN | 111458876 A | 7/2020 |
| CN | 211018982 U | 7/2020 |
| CN | 112153837 A | 12/2020 |
| CN | 112217965 A | 1/2021 |
| CN | 212483982 U | 2/2021 |

OTHER PUBLICATIONS

ISA China National Intellectual Property Administration, International Search Report and Written Opinion Issued in Application No. PCT/CN2022/105665, Sep. 23, 2022, WIPO, 5 pages.

Rejection Decision for Chinese Application No. 202110977244.5, mailed May 9, 2025, 12 pages.

* cited by examiner

WEARABLE ELECTRONIC DEVICE

CROSS REFERENCE TO RELATED APPLICATIONS

The present application is a U.S. National Stage Application of PCT Application Serial No. PCT/CN2022/105665, filed Jul. 14, 2022, which claims priority of the Chinese Patent Application No. 202110977244.5, titled WEARABLE ELECTRONIC DEVICE filed on Aug. 24, 2021, the disclosures of which are incorporated herein by reference in their entireties.

FIELD

The present disclosure relates to the technical field of glasses, and more specifically, to a wearable electronic device.

BACKGROUND

With the continuous development of technology, AR (Augmented Reality) glasses and MR (Mix Reality) glasses have gradually been put into the civilian consumer market. More and more users wear AR glasses and MR glasses in their daily lives. Therefore, the aesthetics of AR glasses and MR glasses become increasingly important.

Limited by the technical implementation of AR glasses and MR glasses, both AR glasses and MR glasses are equipped with exposed camera light-transmitting holes. However, the exposed camera light holes not only make the glasses unsightly, but also put a psychological burden on non-wearers (for example, non-wearers worry about being filmed).

SUMMARY

In order to solve the above technical problems or at least partially solve the above technical problems, the present disclosure provides a wearable electronic device that realizes flexible shielding and exposure of the exposed camera light-transmitting holes.

Embodiments of the present disclosure provide a wearable electronic device, comprising: a glasses frame, two temples respectively connected to the glasses frame, lenses mounted on the glasses frame, at least one camera apparatus disposed in association with the lenses, and a camera light-transmitting hole disposed on the lenses and respectively corresponding to the at least one camera apparatus. The camera apparatus captures images through the corresponding camera light-transmitting hole. A shielding component is disposed on the side of the lens away from the camera apparatus, and the shielding component is used for shielding the corresponding camera light-transmitting hole when the camera apparatus is turned off, and exposing the camera light-transmitting hole when the camera apparatus is turned on, so as to enable light to pass through the camera light-transmitting hole.

Compared with prior arts, the technical solution provided by the embodiments of the present disclosure has the following advantages:

The wearable electronic device provided by the embodiments of the present disclosure, comprises a glasses frame, two temples respectively connected to the glasses frame, lenses mounted on the glasses frame, at least one camera apparatus disposed in association with the lenses, and a camera light-transmitting hole disposed on the lenses and respectively corresponding to the at least one camera apparatus. The camera apparatus captures images through the corresponding camera light-transmitting hole. A shielding component is disposed on the side of the lens away from the camera apparatus, and the shielding component is used for shielding the corresponding camera light-transmitting hole when the camera apparatus is turned off, and exposing the camera light-transmitting hole when the camera apparatus is turned on, so as to enable light to pass through the camera light-transmitting hole. The glasses provided by the embodiments of the present disclosure realize flexible shielding and exposure of the exposed camera light-transmitting hole. When the camera apparatus is turned on and needs to film, the camera light-transmitting hole is exposed so that light can pass through the camera light-transmitting hole to provide sufficient light for the camera apparatus to film. When the camera apparatus is turned off, the camera light-transmitting hole is shielded to improve the aesthetics of the glasses and reduce the psychological discomfort caused by the exposed camera to others.

BRIEF DESCRIPTION OF THE DRAWINGS

The drawings, which are incorporated in and constitute a part of this specification, illustrate embodiments consistent with the present disclosure, and together with the specification, serve to explain the principles of the present disclosure.

In order to more clearly explain the embodiments of the present disclosure or the technical solutions in the prior art, the following will briefly introduce the drawings needed to describe the embodiments or the prior art. It will be apparent that the drawings in the following description are of some embodiments of the present disclosure. For those skilled in the art, other drawings can be obtained based on these drawings without exerting any creative effort.

DETAILED DESCRIPTION OF EMBODIMENTS

Figure 1:
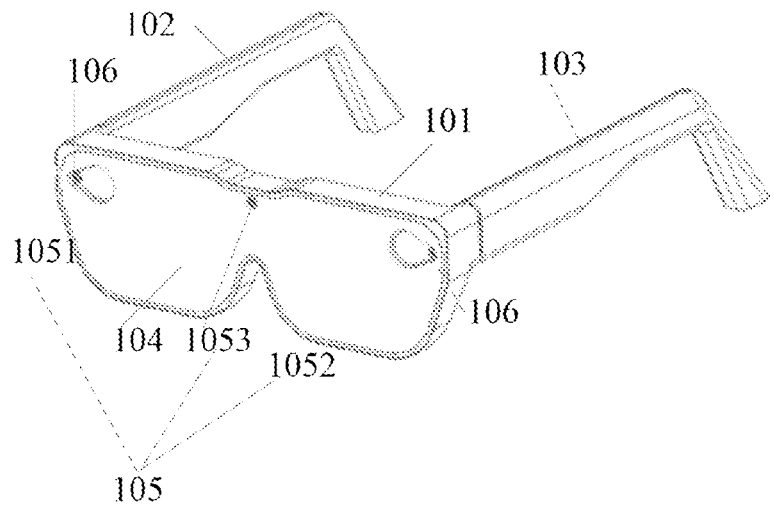
FIG. 1 is a structural schematic diagram of a wearable electronic device with camera light-transmitting holes are exposed provided by an embodiment of the present disclosure.

In order to understand the above purposes, features and advantages of the present disclosure more clearly, the solutions of the present disclosure will be further described below. It should be noted that, as long as there is no conflict, the embodiments of the present disclosure and the features in the embodiments can be combined with each other.

In the following description, numerous specific details are set forth in order to provide a thorough understanding of the present disclosure. However, the present disclosure can also be implemented in other ways different from those described here; obviously, the embodiments in the specification are only some of the embodiments of the present disclosure, rather than all the embodiments.

Embodiments of the present disclosure will be described in more detail below with reference to the accompanying drawings. Although certain embodiments of the present disclosure are shown in the drawings, it should be understood that the present disclosure may be implemented in various forms and should not be construed as limited to the embodiments set forth herein. Rather, these embodiments are provided for a more thorough and complete understanding of the present disclosure. It should be understood that the drawings and embodiments of the present disclosure are for illustrative purposes only and are not intended to limit the scope of the present disclosure.

It should be understood that, various steps described in the method embodiments of the present disclosure may be executed in different orders and/or in parallel. Furthermore, the method embodiments may include additional steps and/or omit performance of illustrated steps. The scope of the present disclosure is not limited in this regard.

As used herein, the term "include" and its variations are open-ended, i.e., "including but not limited to." The term "based on" means "based at least in part on." The term "one embodiment" means "at least one embodiment"; the term "another embodiment" means "at least one additional embodiment"; and the term "some embodiments" means "at least some embodiments". Relevant definitions of other terms will be given in the description below.

It should be noted that, concepts such as "first" and "second" mentioned in the present disclosure are only used to distinguish different apparatuses, modules or units, and are not used to limit the order or interdependence of the functions performed by these apparatuses, modules or units.

It should be noted that, the modifications of "one" and "a plurality of" mentioned in the present disclosure are illustrative and not restrictive. Those skilled in the art will understand that unless the context clearly indicates otherwise, it should be understood as "one or more".

FIG. 1 is a structural schematic diagram of a wearable electronic device with camera light-transmitting holes are exposed provided by an embodiment of the present disclosure. As shown in FIG. 1, the wearable electronic device comprises: a glasses frame 101, a temple 102 and a temple 103 respectively connected to the glasses frame 101, lenses 104 mounted on the glasses frame 101, at least one camera apparatus 106 disposed in association with the lenses 104, and camera light-transmitting holes 105 disposed on the lenses 104 and respectively corresponding to the at least one camera apparatus 106. The camera apparatus 106 captures images through the camera light-transmitting hole 105. A shielding component is dispose on the side of lens 104 away from the temple 102 and the temple 103, or the side away from the camera apparatus 106. The shielding component is used for shielding the camera light-transmitting holes 105 when the camera apparatus 106 is turned off, and exposing the camera light-transmitting holes 105 when the camera apparatus 106 is turned on, so as to enable light to pass through the camera light-transmitting holes 105, providing light for the camera apparatus 106 to enable the camera apparatus 106 to capture clear images. FIG. 1 takes the camera light-transmitting holes 105 as an example including a first camera light-transmitting hole 1051, a second camera light-transmitting hole 1052 and a third camera light-transmitting hole 1053. The first camera light-transmitting hole 1051 and the second camera light-transmitting hole 1052 are respectively disposed on the lenses 104 near the joint of each temple (103 or 102) and the glasses frame 101. Specifically, the first camera light-transmitting hole 1051 is disposed on the lenses 104 near the joint of the temples 102 and the glasses frame 101, and the first camera light-transmitting hole 1052 is disposed on the lenses 104 near the joint of the temples 103 and the glasses frame 101. The third camera light-transmitting hole 1053 is disposed at a position between the first camera light-transmitting hole 1051 and the second camera light-transmitting hole 1052. It can be understood that the number of the camera light-transmitting holes 105 can also be 1, 2, or other numbers greater than 3. Specifically, the glasses may be AR (Augmented Reality) glasses or MR (Mix Reality) glasses. The position of the camera light-transmitting holes 105 is not limited to that shown in FIG. 1, and can also be disposed at other positions.

In one embodiment, the shielding component is an electrochromic flexible film material attached to the side of the lenses 104 away from the temple 102 or the temple 103.

Figure 2:
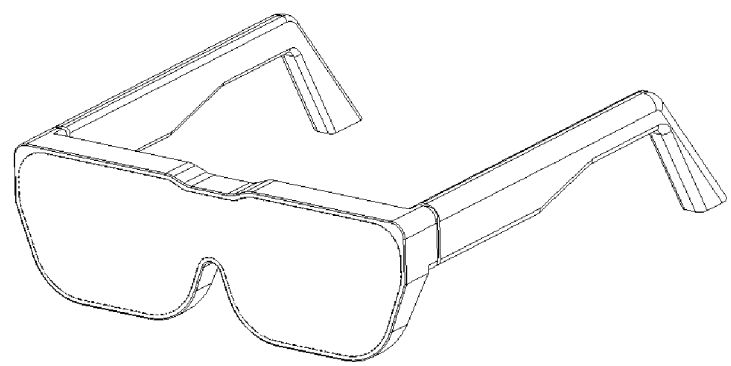
FIG. 2 is a structural schematic diagram of a wearable electronic device with camera light-transmitting holes are shielded provided by an embodiment of the present disclosure.

The electrochromic flexible film material is a material whose optical properties can change reversibly and permanently when driven by external voltage or external current, and can appear as a color change. Therefore, by controlling the external voltage or external current of the electrochromic flexible film material, the color of the electrochromic flexible film material can be controlled, thereby changing the light transmittance of the electrochromic flexible film material, and realizing flexible shielding and exposure of the camera light-transmitting holes 105. Specifically, if the camera apparatus 106 is turned on, the light transmittance of the electrochromic flexible film material is increased by regulating the external voltage or external current of the electrochromic flexible film material, enabling more light to pass through the camera light-transmitting holes 105 to provide the camera apparatus 106 with the light it needs for filming, so as to obtain clear images. At this time, the structural schematic diagram of the wearable electronic device can be referred to as shown in FIG. 1. It can be seen from FIG. 1 that the camera light-transmitting holes 105 are clearly visible, that is, the electrochromic flexible film material applied on the outer surface of the lenses 104 (the outer surface refers to the side away from the temple 102 or temple 103) has a high light transmittance and is close to transparent. When the camera apparatus 106 is turned on, the light transmittance of the electrochromic flexible film is reduced by regulating the external voltage or external current of the electrochromic flexible film, so that the camera light-transmitting holes 105 cannot be seen through the electrochromic flexible film material. That is, the camera light-transmitting holes 105 are shielded by the electrochromic flexible film material, and meanwhile the camera apparatus 106 is also shielded. At this time, the structural schematic diagram of the wearable electronic device can be referred to as shown in FIG. 2. By shielding the camera light-transmitting holes 105, the aesthetics of the glasses can be improved, and the psychological discomfort of others can be reduced without worrying about whether they are being filmed.

Figure 3:
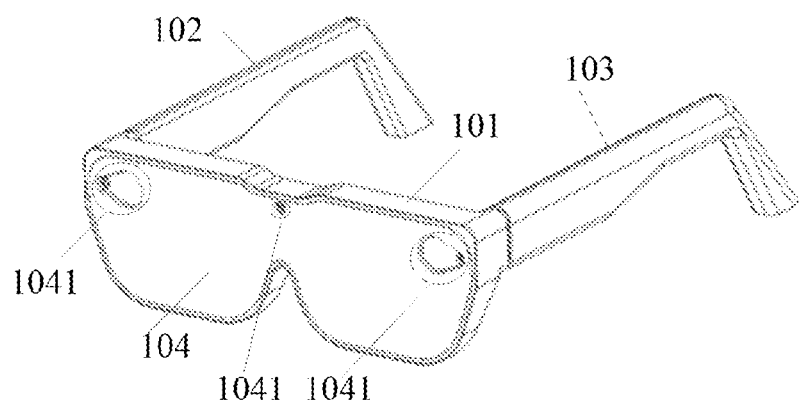
FIG. 3 is a structural schematic diagram of a wearable electronic device provided by an embodiment of the present disclosure.

In one embodiment, in order to save the electrochromic flexible film material, there is no need to apply the electrochromic flexible film material on the entire outer surface of the lenses 104 (the outer surface refers to the side away from the temple 102 or temple 103), but only apply the electrochromic flexible film material to the local area corresponding to the camera light-transmitting holes 105. Specifically, referring to the structural schematic diagram of the wearable electronic device as shown in FIG. 3, the electrochromic flexible film material is only applied to the local area 1041 of the lenses 104. The local area 1041 corresponds to the camera light-transmitting holes 105.

Figure 4:
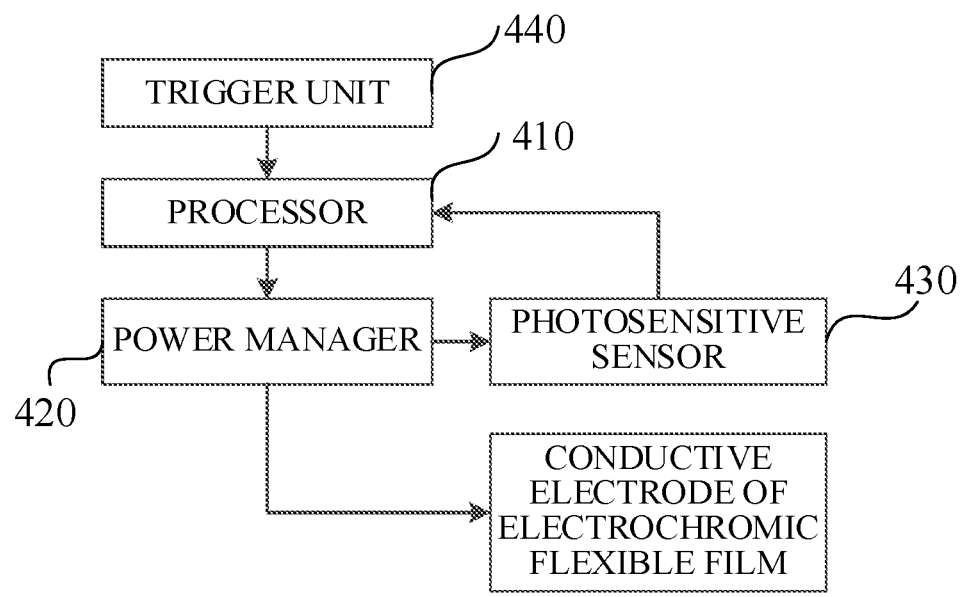
FIG. 4 is a structural schematic diagram of a wearable electronic device control system provided by an embodiment of the present disclosure.
Figure 5:
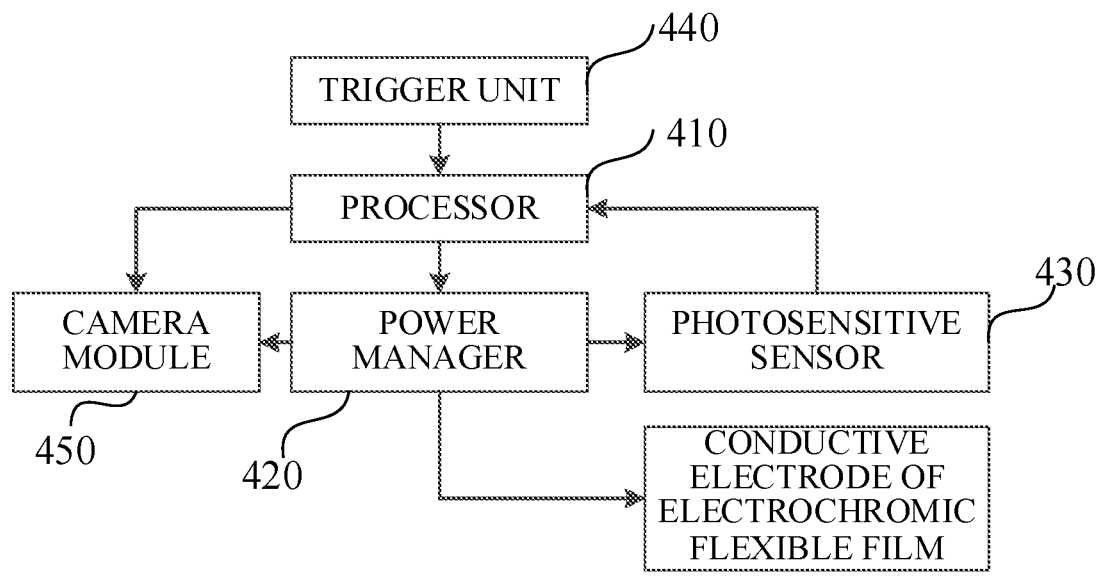
FIG. 5 is a structural schematic diagram of another wearable electronic device control system provided by an embodiment of the present disclosure.

In one embodiment, referring to the structural schematic diagram of the wearable electronic device control system as shown in FIG. 4, the wearable electronic device further comprises: a processor 410, a power manager 420, and a photosensitive sensor 430. Wherein, the processor 410 is electrically connected to the power manager 420, the photosensitive sensor 430, and the trigger unit 440 of the camera apparatus, respectively. The power manager 420 is electrically connected to the photosensitive sensor 430 and the conductive electrode of the electrochromic flexible film material. When the processor 410 receives a turn-on instruction or a turn-off instruction acting on the trigger unit 440, the processor 410 controls the power manager 420 to drive the photosensitive sensor 430 to detect the light transmittance of the electrochromic flexible film material, and controls the voltage or current applied by the power manager 420 to the conductive electrode of the electrochromic flexible film material based on the light transmittance, so as to change the light transmittance of the electrochromic flexible film material. Wherein, the trigger unit 440 is a trigger unit of the camera apparatus, and by acting on the trigger unit 440, the camera apparatus can be turned on and turned off. When the camera is turned on, the processor 410 controls the power manager 420 to drive the photosensitive sensor 430 to start working. The photosensitive sensor 430 detects whether the light transmittance of the electrochromic flexible film material meets the imaging conditions of the camera apparatus, for example, whether it reaches a first set threshold. If the light transmittance of the electrochromic flexible film material does not reach the first set threshold, the processor 410 controls the power manager 420 to change the voltage or current applied to the conductive electrode of the electrochromic flexible film material to increase the light transmittance of the electrochromic flexible film material. When the camera apparatus is turned off, the processor 410 controls the power manager 420 to drive the photosensitive sensor 430 to start working. The photosensitive sensor 430 detects whether the light transmittance of the electrochromic flexible film material meets the conditions for shielding the camera apparatus, for example, whether the light transmittance drops to a second set threshold. If the light transmittance of the electrochromic flexible film material does not drop to the second set threshold, the processor 410 controls the power manager 420 to change the voltage or current applied to the conductive electrode of the electrochromic flexible film material to reduce the light transmittance of the electrochromic flexible film material to achieve the purpose of shielding the camera and the camera light-transmitting holes. Further, as shown in FIG. 5, the wearable electronic device further comprises: a camera module 450. The camera module 450 electrically connected to the processor 410 and the power manager 420 respectively, and is used to drive the camera module 450 through the power manager 420 for filming under the control of the processor 410.

Figure 6:
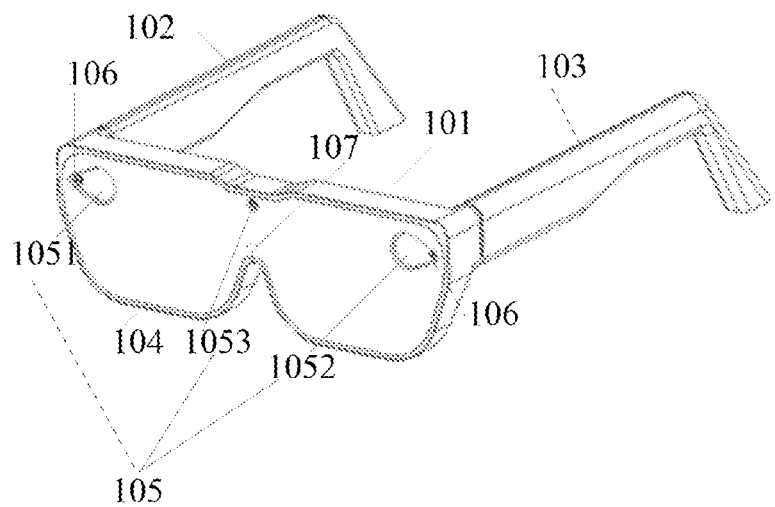
FIG. 6 is a structural schematic diagram of a wearable electronic device comprising a photosensitive sensor light-transmitting hole provided by an embodiment of the present disclosure.

In one embodiment, referring to the structural schematic diagram of the wearable electronic device including a photosensitive sensor light-transmitting hole as shown in FIG. 6, the glasses comprise: a glasses frame 101, a temple 102 and a temple 103 respectively connected to the glasses frame 101, lenses 104 mounted on the glasses frame 101, at least one camera light-transmitting hole 105 disposed on the lenses 104, and a camera apparatus 106 disposed corresponding to the at least one camera light-transmitting hole 105. The camera apparatus 106 captures images through the camera light-transmitting hole 105. A shielding component is disposed on the side of the lens 104 away from the temples 102 and the temple 103. The shielding component is used for shielding the camera light-transmitting hole 105 when the camera apparatus 106 is turned off, and exposing the camera light-transmitting hole 105 when the camera apparatus 106 is turned on, so as to enable light to pass through the camera light-transmitting hole 105, providing light for the camera apparatus 106 to enable the camera apparatus 106 to capture clear images. FIG. 6 takes the camera light-transmitting holes 105 as an example including a first camera light-transmitting hole 1051, a second camera light-transmitting hole 1052 and a third camera light-transmitting hole 1053. The first camera light-transmitting hole 1051 and the second camera light-transmitting hole 1052 are respectively disposed on the lenses 104 near the joint of each temple (103 or 102) and the glasses frame 101. Specifically, the first camera light-transmitting hole 1051 is disposed on the lenses 104 near the joint of the temples 102 and the glasses frame 101, and the second camera light-transmitting hole 1052 is disposed on the lenses 104 near the joint of the temples 103 and the glasses frame 101. The third camera light-transmitting hole 1053 is disposed at a position between the first camera light-transmitting hole 1051 and the second camera light-transmitting hole 1052. The wearable electronic device further comprises: a photosensitive sensor light-transmitting hole 107 disposed in association with the third camera light-transmitting hole 1053. It can be understood that the position of the photosensitive sensor light-transmitting hole 107 on the lenses 104 is not limited to that shown in FIG. 6, and the photosensitive sensor light-transmitting hole 107 can also be disposed at other positions. In order to improve the aesthetics of the wearable electronic device, taking FIG. 6 as an example, an electrochromic flexible film material can be applied to the area 1071 on the lenses 104 corresponding to the photosensitive sensor light-transmitting hole 107, so that when the photosensitive sensor is not required to work, the photosensitive sensor light-transmitting hole 107 is shielded by the electrochromic flexible film material.

In one embodiment, the electrochromic flexible film material includes a solid electrochromic flexible film material or a liquid electrochromic flexible film material. According to structural classification, the electrochromic flexible film materials can be divided into liquid electrochromic flexible film materials and solid electrochromic flexible film materials. Wherein, the liquid electrochromic flexible film material exists in the form of a solution in the device, and during the color change process, the electrochromic material always exists in the liquid form. The solid electrochromic flexible film material exists in the solid form, and during the oxidation-reduction discoloration process, the functional layer remains in the form of a solid film, typically a sandwich structure. The middle layer is an electrolyte, which is mainly used to conduct ions. It is a pure ion conductor and isolates the electrochromic film from the ion storage film. The upper and lower layers sandwiching the middle layer are transparent conductive layers, whose function is to transport electrons from the external circuit to the electrolyte. Driven by an external voltage, when ions in the electrolyte are inserted into or extracted from the film, oxidation-reduction reactions occur, so that the optical properties of the film change, and the appearance appears as a color change, achieving the discoloration function.

The above description is only a description of the preferred embodiments of the present disclosure and the technical principles applied. Those skilled in the art should understand that the disclosure scope involved in the present disclosure is not limited to technical solutions comprising specific combinations of the above technical features, but should also cover other technical solutions comprising any combination of the above technical features or their equivalent features without departing from the above disclosed concept. For example, a technical solution is formed by replacing the above features with (but not limited to) technical features with similar functions disclosed in this disclosure.

It should be noted that, herein, relational terms such as "first" and "second" are used merely to distinguish one entity or operation from another entity or operation, and do not necessarily require or imply any such actual relationship or sequence between these entities or operations. Furthermore, terms "include," "comprise," or any other variation thereof are intended to cover a non-exclusive inclusion. Thus a process, method, article or device that includes a list of elements includes not only those elements but also other elements not expressly listed, or elements that are inherent to such process, method, article or device. Without further limitation, an element defined by the statement "comprising a . . . " does not exclude the presence of additional identical elements in a process, method, article, or apparatus that includes the stated element.

The above descriptions are only specific embodiments of the present disclosure, enabling those skilled in the art to understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not to be limited to the embodiments described herein but complies with the widest scope consistent with the principles and novel features disclosed herein.

We claim:

1. A wearable electronic device, comprising: a glasses frame;
two temples, respectively connected to the glasses frame;
lenses, mounted on the glasses frame; at least one camera apparatus, disposed in association with the lenses; and a camera light-transmitting hole, disposed on the lenses and respectively corresponding to the at least one camera apparatus, wherein the camera apparatus captures images through the corresponding camera light-transmitting hole,
wherein a shielding component is disposed on a side of the lenses away from the camera apparatus, and the shielding component is used for shielding the corresponding camera light-transmitting hole when the camera apparatus is turned off, and exposing the camera light-transmitting hole when the camera apparatus is turned on, so as to enable light to pass through the camera light-transmitting hole;
wherein the camera light-transmitting hole comprises a first camera light-transmitting hole and a second camera light-transmitting hole, wherein the first camera light-transmitting hole and the second camera light-transmitting hole are respectively disposed on the lenses near a joint of each of the temples and the glasses frame; and
wherein the wearable electronic device further comprises a third camera light-transmitting hole and a photosensitive sensor light-transmitting hole, wherein the third camera light-transmitting hole is disposed at a position between the first camera light-transmitting hole and the second camera light-transmitting hole; and the photosensitive sensor light-transmitting hole is disposed in association with the third camera light-transmitting hole.

2. The wearable electronic device of claim 1, wherein the shielding component is an electrochromic flexible film material attached to the side of the lenses away from the camera apparatus.

3. The wearable electronic device of claim 2, wherein the electrochromic flexible film material is attached to the side of the lenses away from the camera apparatus and is in a local area corresponding to the camera light-transmitting hole.

4. The wearable electronic device of claim 2, wherein the electrochromic flexible film material comprises a solid electrochromic flexible film material or a liquid electrochromic flexible film material.

5. The wearable electronic device of claim 2, further comprising: a processor, a power manager, and a photosensitive sensor, wherein:
the processor is electrically connected to the power manager, the photosensitive sensor, and a trigger unit of the camera apparatus, respectively; the power manager is electrically connected to the photosensitive sensor and a conductive electrode of the electrochromic flexible film material; when the processor receives a turn-on instruction or a turn-off instruction of the camera apparatus acting on the trigger unit, the processor controls the power manager to drive the photosensitive sensor to detect a light transmittance of the electrochromic flexible film material, and controls a voltage or current applied by the power manager to the conductive electrode of the electrochromic flexible film material based on the light transmittance, so as to change the light transmittance of the electrochromic flexible film material.

6. The wearable electronic device of claim 5, wherein the camera apparatus comprises a camera module, wherein the camera module is electrically connected to the processor and the power manager respectively, and is used to drive the camera module through the power manager for filming under control of the processor.

* * * * *